Jan. 9, 1951         E. C. CROWTHER         2,537,575
SCREW AND WASHER ASSEMBLY
Filed Sept. 25, 1944
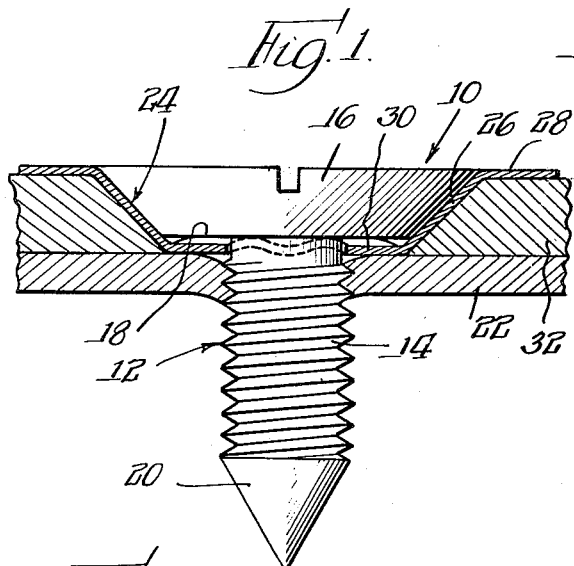
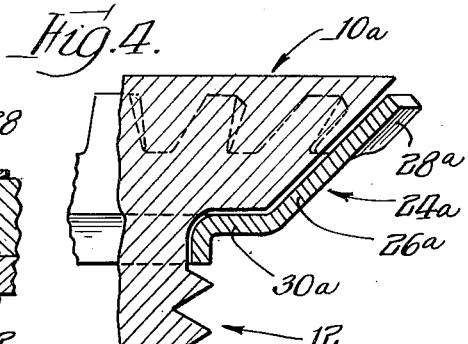
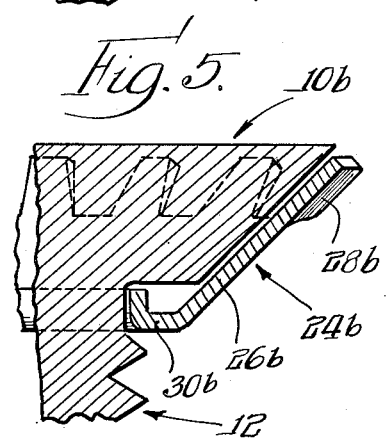
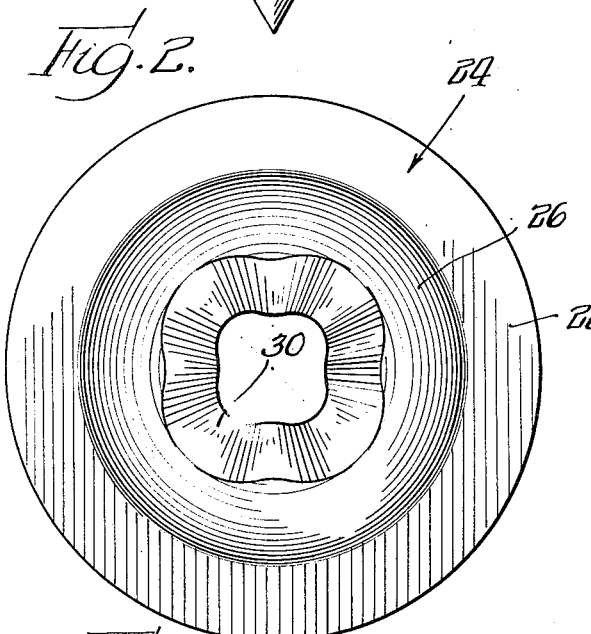
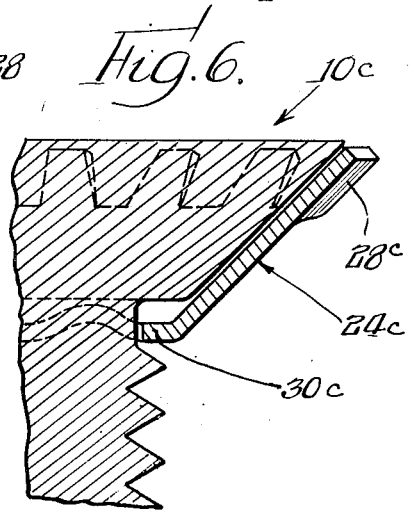
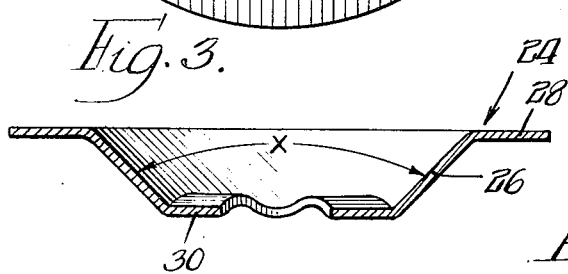
INVENTOR.
Edmond C. Crowther
By:- Loftus, Moore, Olson & Trexler
attys.

Patented Jan. 9, 1951

2,537,575

UNITED STATES PATENT OFFICE 2,537,575

SCREW AND WASHER ASSEMBLY

Edmond C. Crowther, Philadelphia, Pa., assignor to Illinois Tool Works, Chicago, Ill., a corporation of Illinois Application September 25, 1944, Serial No. 555,611

2 Claims. (Cl. 151—32)

This invention relates generally to fastener units and more particularly to fastener units comprising a headed screw element and a washer member secured adjacent the screw head by an extruded thread convolution.

The present invention is particularly concerned with fastener units of the type capable of being used with relatively thin stock. In instances where the sheet stock is relatively thin the use of a conventional flat headed screw is rendered difficult because of the axial extent of the frusto-conical surface of the screw head. In conventional flat headed screws this axial extent or distance is so great that such screws can only be used for holding relatively heavy gauge material to a supporting structure. In instances where the sheet stock which is to be secured in place is of light gauge or is, for example, of fabric construction, the conventional flat headed screw and complementary conical type washer cannot successfully be employed. The present invention contemplates a fastener unit in which a countersunk washer and a complementary frusto-conical screw head are specially designed with the view of enabling the use of the fastener with relatively thin materials.

More specifically, it is an object of the present invention to provide a fastener unit of the type referred to above wherein the included angle of the complementary conical surfaces of the screw head and washer are greater than conventional designs whereby to provide less axial extent or in other words a flatter type construction.

A further object of the invention is to provide in a fastener unit of the type set forth above a conical washer of novel design which is so formed along its inner margin as to positively prevent unauthorized loosening after it has once been secured in position beneath the screw head.

Still more specifically it is an object of the present invention to provide a depth required for drawing or forming the washer which is less than is required for standard countersunk washers. This is particularly advantageous in the manufacture of spring action lock washers which must be made of a high carbon steel.

The foregoing and other objects and advantages will be more apparent from the following detailed description when considered in connection with the accompanying drawing wherein Figure 1 is a vertical sectional view of a fastener unit constructed in accordance with the teachings of the present invention, said unit being shown in operative association with a pair of sheet members;

Figure 2 is a plan view of the washer member illustrated in Figure 1;

Figure 3 is a central vertical section of the washer element detached from the screw member;

Figure 4 is a fragmentary sectional view of a fastener unit having a conical washer of modified form, the inner margin thereof being bent outwardly to afford increased axial extent in that vicinity;

Figure 5 is a view similar to Figure 4 disclosing a fastener unit in which the washer element along its inner margin is bent inwardly to afford increased axial extent in that vicinity; and Figure 6 is a fragmentary sectional view similar to Figures 4 and 5, disclosing a conical washer with an internal corrugated margin and external locking teeth.

Referring now to the drawing more in detail wherein like numerals have been employed to designate similar parts throughout the various figures, it will be seen that one embodiment of the invention contemplates a fastener unit designated generally by the numeral 10, Figure 1. This fastener unit includes a screw member 12 having a threaded shank 14 and a head 16 at one end thereof. Particular attention is directed to the manner in which the head 16 is formed. The included angle X is greater than the included angle of conventional flat headed screws, and a portion of the head in the vicinity of the uppermost thread convolutions is removed to provide a flat annular clamping surface 18. The opposite or entering extremity of the screw 12 is preferably formed with a point 20 to facilitate initial entry of the screw within the metallic work sheet or plate 22. In the particular embodiment disclosed in Figure 1 the screw is of the self-threading variety capable of forming or indenting its own thread in the metallic work sheet 22.

The other element of the fastener unit 10 constitutes a washer member 24 which is of conical or countersunk design. In Figures 1 to 3, inclusive, the washer 24 includes a countersunk or conical body section 26 which is flared at its outer margin to provide a flange 28. At the bottom of the body portion 26 is an inwardly extending corrugated section 30 adapted to be positioned immediately adjacent the surface 18 of the screw head 16. The center of the corrugated section 30 is apertured to accommodate the shank of the screw 12. It will be noted that the washer is held in position adjacent the clamping surface 18 of the screw head 16 by the uppermost convolution of the screw shank 14. The washer and screw element are assembled by first telescopically associating the washer and unthreaded screw blank. Subsequently a thread is rolled on the screw blank and this causes sufficient enlargement in the diameter of the screw so as to provide an abutment extending beyond the diameter of the washer.

In instances where the washer stock is relatively thin there is ever present the danger of the washer and screw becoming unthreaded. That is to say, the thinness of the washer stock makes it possible for the inner margin of the washer to move within the helical thread convolutions. To avoid this difficulty the section 30 is given a greater axial dimension by providing the corrugations or undulations, as illustrated in Figure 1. This increase in axial over-all dimension of the inner margin of the washer is greater than the axial pitch of the screw thread and hence precludes any possibility of the washer stock following within the helical path of the screw thread.

It will also be apparent that the undercutting of the screw head and the increase in the included angle X over conventional flat headed screws makes it possible to use the combined screw and washer assembly on relatively thin materials. The axial over-all dimension of the head of a conventional flat headed screw is such as to preclude the use thereof in clamping relatively thin sheet material to a supporting plate or backing. Figure 1 illustrates how one form of washer having the outwardly flaring flanges 28 which afford increased clamping area may be used to clamp relatively thin stock 32 to the metallic sheet or base 22. Such fastener units have been very successfully employed to secure fabric materials against the surface of sheet metal parts and the like.

In Figure 4 a slightly modified form of fastener unit designated generally by the numeral 10a is shown. The screw head and shank are identical with the structure shown in Figure 1. This difference resides in the form of washer which is held in position beneath the screw head. The washer of Figure 4 is designated generally by the numeral 24a and includes a countersunk or conical body portion 26a, and a plurality of outer marginal locking teeth 28a designed to lockingly engage the conical clamping surface of the screw head. An inner washer section 30a is bent downwardly at its innermost margin so as to provide sufficient increase in axial dimension to prevent inadvertent unscrewing of the screw and washer. This outwardly turned portion may be in the nature of a continuous annular flange or series of protuberances.

Figure 5 discloses a still further modification, the fastener unit therein being designated by the numeral 10b. The screw structure is similar to that disclosed in Figures 1 and 4 but the lock washer 24b includes a conical body portion 26b, a plurality of external screw locking teeth 28b and an inner marginal section 30b. The section 30b is bent upwardly or inwardly to provide increased axial dimension and thereby prevent inadvertent unscrewing of the parts. This bent up section of the washer portion 30b may constitute a continuous flange or protuberances.

In Figure 6 a fastener unit 10c is shown wherein the lock washer 24c having locking teeth 28c is formed along its inner margin with a section 30c. This section 30c is corrugated or undulated similarly to the section 30 of Figure 1. Thus the lock washer 24c is secured against inadvertent unscrewing by reason of the increase in axial dimension provided by the undulated internal margin.

In drawing sheet metal to form conical type washers of the type which have heretofore been used, a relatively deep draw is necessitated. Because of this necessity it has been common practice to employ sheet steel of a somewhat softer grade or lower carbon content than steel used in the production of flat type washers. As a result conical washers do not have as good spring action or resistance to flattening as the flat washers. The present invention therefore, by reducing the depth of the draw, makes it possible to use sheet metal of higher carbon content and consequently the resistance to flattening is materially enhanced.

From the foregoing it will be apparent that the present invention contemplates a fastener unit in which the screw head and washer are of the conical type and which are positively secured against axial separation. Also, the novel arrangement of screw head and washer combine to produce a fastener device which may be used for securing sheet materials of exceeding thinness. The invention is particularly applicable in instances where such sheet material must be clamped in position by a flat headed screw. There are instances where flat headed screws are necessary in order to obtain flush relationship between the outer surface of the screw head and the adjacent surface of the work. The present invention makes possible this flush relationship even in instances where the part to be secured is relatively thin. For purposes of illustration, specific structural details have been disclosed herein, but obviously the invention is not to be limited to such details but is capable of other modifications and changes without departing from the spirit and scope of the appended claims. In this connection it will be noted that while reference has been made to the possibility of employing flat type screws in which the conical head has a larger included angle than the conventional head, the invention is by no means limited to that type of head but has a very practical application to conical screw heads and washers having the conventional included angle.

The invention is hereby claimed as follows:

1. A fastener unit including a screw having a threaded shank and an undercut frusto-conical head at one extremity thereof, a washer having a frusto-conical body portion with the inner face thereof conforming substantially in shape to the adjacent frusto-conical surface of the screw head and also having an annular flange section bent inwardly of the reduced end of the body portion of the washer toward the screw shank and substantially radially coextensive with the adjacent undercut screw head surface, and locking teeth carried by the frusto-conical body portion of the washer, the inwardly bent annular flange section of the washer having the free inner margin thereof shaped to extend axially a distance greater than the thickness of the washer stock whereby to prevent relative unscrewing of the washer and screw, said inner margin encircling an unthreaded portion of the screw shank and having a diameter less than the outer diameter of the screw thread adjacent said inner margin.

2. A fastener unit including a screw having a threaded shank and an undercut frusto-conical head at one extremity thereof, a washer having a frusto-conical body portion with the inner face thereof conforming substantially in shape to the adjacent frusto-conical surface of the screw head and also having an annular flange section bent inwardly of the reduced end of the body portion of the washer toward the screw shank and substantially radially coextensive with the adjacent undercut screw head surface, the inwardly bent annular flange section of the washer being undulated to increase the overall axial thickness to an extent greater than the thickness of the washer stock whereby to prevent relative unscrewing of the washer and screw, said inner margin encircling an unthreaded portion of the screw shank and having a diameter less than the outer diameter of the screw thread adjacent said inner margin.

EDMOND C. CROWTHER.

REFERENCES CITED

The following references are of record in the file of this patent:

UNITED STATES PATENTS

| Number | Name | Date |
|---|---|---|
| 156,699 | Fuller | Nov. 10, 1874 |
| 218,991 | Loomis | Aug. 26, 1879 |
| 777,192 | Ette | Dec. 13, 1904 |
| 1,031,368 | Perry | July 2, 1912 |
| 1,604,122 | Hosking | Oct. 26, 1926 |
| 1,645,859 | Hosking | Oct. 18, 1927 |
| 1,725,440 | Carns | Aug. 20, 1929 |
| 1,788,735 | Olson | Jan. 13, 1931 |
| 2,030,088 | Young | Feb. 11, 1936 |
| 2,113,425 | Crowther | Apr. 5, 1938 |
| 2,150,126 | Olson | Mar. 7, 1939 |
| 2,192,322 | Mitchell | Mar. 5, 1940 |
| 2,227,464 | Olson | Jan. 7, 1941 |
| 2,297,957 | Hanneman | Oct. 6, 1942 |
| 2,424,208 | Poupitch | July 15, 1947 |

FOREIGN PATENTS

| Number | Country | Date |
|---|---|---|
| 103,274 | Austria | May 10, 1926 |